United States Patent
Reiter et al.

[11] Patent Number: 6,049,872
[45] Date of Patent: Apr. 11, 2000

[54] METHOD FOR AUTHENTICATING A CHANNEL IN LARGE-SCALE DISTRIBUTED SYSTEMS

[75] Inventors: Michael Kendrick Reiter, Raritan; Stuart Gerald Stubblebine, Lebanon, both of N.J.

[73] Assignee: AT&T Corporation, New York, N.Y.

[21] Appl. No.: 08/851,658

[22] Filed: May 6, 1997

[51] Int. Cl.[7] ............................. H04L 9/32; G06F 3/00
[52] U.S. Cl. ................ 713/157; 713/150; 713/155; 713/168; 713/229; 713/201
[58] Field of Search ................. 380/25, 49; 713/200, 713/201, 155, 156, 157, 168, 175, 150; 709/220, 223, 224, 225, 229

[56] References Cited

U.S. PATENT DOCUMENTS

| | | | |
|---|---|---|---|
| 4,888,801 | 12/1989 | Foster et al. | 380/21 |
| 5,371,744 | 12/1994 | Campbell et al. | 371/8.2 |
| 5,455,865 | 10/1995 | Perlman | 380/49 |
| 5,675,741 | 10/1997 | Aggarwal et al. | 709/224 |
| 5,706,436 | 1/1998 | Lewis et al. | 709/224 |
| 5,774,552 | 6/1998 | Grimmer | 380/25 |
| 5,850,516 | 12/1998 | Schneier | 713/200 |
| 5,892,903 | 4/1999 | Klaus | 713/201 |

*Primary Examiner*—Gilberto Barron, Jr.
*Attorney, Agent, or Firm*—Kenyon & Kenyon

[57] ABSTRACT

Authenticating the source of a message in a large distributed system can be difficult due to the lack of a single authority that can tell for whom a channel speaks. This has led many to propose the use of a path of authorities, each able to authenticate the next, such that the first authority in the path can be authenticated by the message recipient and the last authority in the path can authenticate the message source. The present invention uses multiple ones of such paths, no two of which share a common authority, to provide independent confirmation of the message source. As the problem of finding a maximum set of such paths of bounded length in a graph-theoretic framework can be shown to be NP-hard, the present invention includes approximation algorithms for this problem. The present invention also includes a Path-Server for PGP, a service for finding maximum sets of such paths to support authentication in PGP-based applications.

33 Claims, 11 Drawing Sheets

FIG. 2

| TABLE 3: GRAPHS USED IN TESTING ||||||||
|---|---|---|---|---|---|---|---|
| GRAPH | $G_5$ | $G_{10}$ | $G_{15}$ | $G_{20}$ | $G_{25}$ | $G_{30}$ | $G_{40}$ |
| NONTRIVAL NODES | 1,105 | 1,846 | 2,477 | 3,011 | 3,487 | 3,881 | 4,636 |
| NONTRIVIAL EDGES | 768 | 1,518 | 2,265 | 2,978 | 3,687 | 4,406 | 5,809 |
| CONNECTED NODE PAIRS  b=5 | 1,498 | 6,906 | 20,639 | 45,341 | 73,299 | 117,081 | 204,776 |
| CONNECTED NODE PAIRS  b=10 | 1,652 | 12,324 | 50,515 | 92,994 | 170,771 | | |
| CONNECTED NODE PAIRS  b=15 | 1,652 | 14,263 | 54,522 | 95,115 | | | |
| MULTIPLY CONNECTED NODE PAIRS  b=5 | | | | | | | 33,079 |
| MULTIPLY CONNECTED NODE PAIRS  b=10 | | | | | | | |
| MULTIPLY CONNECTED NODE PAIRS  b=15 | | | | | | | |

FIG. 3

| TABLE 4: ACCURACY RESULTS FOR MULTIPLY CONNECTED PAIRS |||||||||||||
|---|---|---|---|---|---|---|---|---|---|---|---|---|
| | | INDEPENDENT SET | | | LENGTH | | | DEGREE | | | RANDOM | | |
| | | ERR | AVG | MAX | ERR | AVG | MAX | ERR | AVG | MAX | ERR | AVG | MAX |
| $G_5$ | b=5 | .000 | $\perp$ | 0 | .000 | $\perp$ | 0 | .000 | $\perp$ | 0 | .000 | $\perp$ | 0 |
| | b=10 | .000 | $\perp$ | 0 | .000 | $\perp$ | 0 | .000 | $\perp$ | 0 | .000 | $\perp$ | 0 |
| | b=15 | .000 | $\perp$ | 0 | .000 | $\perp$ | 0 | .000 | $\perp$ | 0 | .000 | $\perp$ | 0 |
| $G_{10}$ | b=5 | .000 | $\perp$ | 0 | .008 | 1.000 | 1 | .004 | 1.000 | 1 | .016 | 1.000 | 1 |
| | b=10 | .000 | $\perp$ | 0 | .025 | 1.000 | 1 | .032 | 1.000 | 1 | .051 | 1.000 | 1 |
| | b=15 | .000 | $\perp$ | 0 | .021 | 1.000 | 1 | .030 | 1.000 | 1 | .036 | 1.000 | 1 |
| $G_{15}$ | b=5 | .000 | $\perp$ | 0 | .095 | 1.000 | 1 | .067 | 1.000 | 1 | .089 | 1.000 | 1 |
| | b=10 | .000 | 1.000 | 1 | .152 | 1.004 | 2 | .123 | 1.003 | 2 | .160 | 1.007 | 2 |
| | b=15 | .002 | 1.000 | 1 | .076 | 1.004 | 2 | .053 | 1.003 | 2 | .091 | 1.006 | 2 |
| $G_{20}$ | b=5 | .001 | 1.000 | 1 | .140 | 1.011 | 2 | .100 | 1.005 | 2 | .132 | 1.011 | 2 |
| | b=10 | .005 | 1.000 | 1 | .168 | 1.018 | 2 | .119 | 1.009 | 2 | .165 | 1.019 | 2 |
| | b=15 | .008 | 1.000 | 1 | .109 | 1.008 | 2 | .079 | 1.003 | 2 | .119 | 1.019 | 2 |
| $G_{25}$ | b=5 | .002 | 1.000 | 1 | .164 | 1.017 | 2 | .101 | 1.009 | 2 | .156 | 1.017 | 2 |
| | b=10 | .009 | 1.025 | 2 | .167 | 1.017 | 2 | .112 | 1.011 | 2 | .168 | 1.028 | 3 |
| $G_{30}$ | b=5 | .002 | 1.000 | 1 | .192 | 1.037 | 3 | .105 | 1.012 | 2 | .183 | 1.030 | 3 |
| $G_{35}$ | b=5 | .005 | 1.006 | 2 | .237 | 1.064 | 3 | .115 | 1.028 | 3 | .224 | 1.062 | 3 |

FIG. 4A

Search Results

C7A966DD SAYS A07786A1 => BETSI <certify@bellcore.com>
A07786A1 SAYS A40B96D9 => AVIEL D. RUBIN <rubin@faline.bellcore.com>

C7A966DD SAYS 4B2700B9 => ROSS ANDERSON <rja14@cl.cam.ac.uk>
4B2700B9 SAYS A8DA7A71 => THOMAS A. BERSON <berson@anagram.com>
A8DA7A71 SAYS A40B96D9 => AVIEL D. RUBIN <rubin@faline.bellcore.com>

C7A966DD SAYS 4D0C4EE1 => JEFFREY I. SCHILLER <jis@mit.edu>
4D0C4EE1 SAYS 10E25B71 => MARSHALL ROSE <mrose@dbc.mtview.ca.us>
10E25B71 SAYS A87406A1 => J. PAUL HOLBROOK <holbrook@cic.net>
A87406A1 SAYS 7DFF8533 => PETER HONEYMAN <honey@citi.umich.edu>
7DFF8533 SAYS A40B96D9 => AVIEL D. RUBIN <rubin@faline.bellcore.com>

C7A966DD SAYS 8DE722D9 => BRANKO LANKESTER <branko@hacktic.nl>
8DE722D9 SAYS F00F0421 => cert-nl.master-certification-key
F00F0421 SAYS D5327CB9 => WIETSE VENEMA <wietse@wzv.win.tue.nl>
D5327CB9 SAYS A40B96D9 => AVIEL D. RUBIN <rubin@faline.bellcore.com>

C7A966DD SAYS 4AAF00E5 => DAVE DEL TORTO <ddt@lsd.com>
4AAF00E5 SAYS C053E51D => VINNIE MOSCARITOLO <vinnie@apple.com>
C053E51D SAYS 38D916D5 => MARSHALL CLOW <mclow@mailhost2.csusm.edu>
38D916D5 SAYS 540D8AB1 => SIG PORTER <sporter@electriciti.com>
540D8AB1 SAYS 955EC2C1 => PHIL KARN <karn@ka9q.ampr.org>
955EC2C1 SAYS E4E403F1 => STUART G. STUBBLEBINE <stubblebine@research.att.com>
E4E403F1 SAYS 74FCBE55 => MICHAEL K. REITER <reiter@research.att.com>

FIG. 4B

74FCBE55 SAYS A40B96D9 => AVIEL D. RUBIN <rubin@faline.bellcore.com>

C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>

C7A966DD SAYS 9C680151 => TOM PERRINE <tep@sdsc.edu>
9C680151 SAYS F940AB85 => DANIEL V. KLEIN <dvk@lonewolf.com>
F940AB85 SAYS FC0C02D5 => EUGENE H. SPAFFORD <spaf@cs.purdue.edu>
FC0C02D5 SAYS A40B96D9 => AVIEL D. RUBIN <runbin@faline.bellcore.com>

C7A966DD SAYS C1B06AF1 => DEREK ATKINS <warlord@MIT.EDU>
C1B06AF1 SAYS E1AED86F => JOHN A. PERRY <perry@jpunix.com>
E1AED86F SAYS CE766B1F => PAUL C. LEYLAND <pcl@ox.ac.uk>
CE766B1F SAYS D5327CB9 => WIETSE VENEMA <wietse@wzv.win.tue.nl>
D5327CB9 SAYS A40B96D9 => AVIEL D. RUBIN <rubin@faline.bellcore.com>

C7A966DD SAYS 32DD98D9 => VESSELIN V. BONTCHEV <bontchev@fbihh.informatik.uni-hambur
32DD98D9 SAYS 9A661001 => MORTON SWIMMER <swimmer@acm.org>
9A661001 SAYS 3F0D98DD => STEFAN KELM, DFN-CERT <kelm@cert.dfn.de>
3F0D98DD SAYS 502A5241 => IVANA VAN OVERMEEREN <ivana@giga.nl>
502A5241 SAYS A4285509 => ERIK HUIZER <Erik.Huizer@SURFnet.nl>
A4285509 SAYS DA0EDC81 => PHIL KARN <karn@unix.ka9q.ampr.org>
DA0EDC81 SAYS A40B96D9 = AVIEL D. RUBIN <rubin@faline.bellcore.com>

C7A966DD SAYS A07786A1 => BETSI <certify@bellcore.com>
A07786A1 SAYS A40B96D9 => AVIEL D. RUBIN <rubin@faline.bellcore.com>

C7A966DD SAYS 9D997D47 => PETER GUTMANN <pgut1@cs.aukuni.ac.nz>
9D997D47 SAYS 2FEA2EF1 => USENIX ASSOCIATION MASTER KEY <not-for-mail>
2FEA2EF1 SAYS C72B5425 => <pgp@mcc.ac.uk>

FIG. 4C

```
C72B5425 SAYS 4BDCFB31 => A V Le BLANC <LeBlanc@mcc.ac.uk>
4BDCFB31 SAYS 4DBA1091 => GREGORY G. ROSE <ggr@rss.com.au>
4DBA1091 SAYS FC0C02D5 => EUGENE H. SPAFFORD <spaf@cs.purdue.edu>
FC0C02D5 SAYS A40B96D9 => AVIEL D. RUBIN <rubin@faline.bellcore.com>

C7A966DD SAYS 865AA7F3 => COLIN PLUMB <colin@nyx.cs.du.edu>
865AA7F3 SAYS 2B48F6F5 => IAN GOLDBERG <ian@cypherpunks.ca>
2B48F6F5 SAYS 09590CFD => PETER N. WAN <peter.wan@cc.gatech.edu>
09590CFD SAYS 30BE6FA9 => KENNETH R. VAN WYK <ken@cip.saic.com>
30BE6FA9 SAYS 78874595 => WILLIAM McVEY <wam@cc.purdue.edu>
78874595 SAYS 7DFF8533 => PETER HONEYMAN <honey@citi.umich.edu>
7DFF8533 SAYS A40B96D9 => AVIEL D. RUBIN <rubin@faline.bellcore.com>

C7A966DD SAYS 7D63A5C5 => HAL ABELSON <hal@mit.edu>
7D63A5C5 SAYS 825D6579 => TAI JIN <tai@hpl.hp.com>
825D6579 SAYS 46F3212D => LaMONT JONES <lamont@hp.com>
46F3212D SAYS 0DBF906D => JEFFREY I. SCHILLER <jis@mit.edu>
0DBF906D SAYS E4E403F1 => STUART G. STUBBLEBINE <stubblebine@research.att.com>
E4E403F1 SAYS 74FCBE55 => MICHAEL K. REITER <reiter@research.att.com>
74FCBE55 SAYS A40B96D9 => AVIEL D. RUBIN <rubin@faline.bellcore.com>

C7A966DD SAYS 67ECF13D => DAVID A. BARNHART <CIS:70275,1360>
67ECF13D SAYS 18239E91 => ROBERT C. CASAS <73763.20@compuserve.com>
18239E91 SAYS DA87C0C7 => EDGAR W. SWANK <edgar@spectrx.sbay.org>
DA87C0C7 SAYS 077A2F7F => IAN HEBERT <ian@braille.uwo.ca>
077A2F7F SAYS 3FA76F7D => JOSEPH H. CHOU <jchou@socrates.ucsf.edu>
3FA76F7D SAYS 9CF495B9 => MARK D. BAUSHKE <mdb@cisco.com>
9CF495B9 SAYS ADD64C19 => KARYN PICHNARCZYK <karyn@cisco.com>
ADD64C19 SAYS FC0C02D5 => EUGENE H. SPAFFORD <spaf@cs.purdue.edu>
FC0C02D5 SAYS A40B96D9 => AVIEL D. RUBIN <rubin@faline.bellcore.com>
```

FIG. 4D

```
C7A966DD SAYS 4B2700B9 => ROSS ANDERSON <rja14@cl.cam.ac.uk>
4B2700B9 SAYS A8DA7A71 => THOMAS A. BERSON <berson@anagram.com>
A8DA7A71 SAYS A40B96D9 => AVIEL D. RUBIN <rubin@faline.bellcore.com>

C7A966DD SAYS DA0EDC81 => PHIL KARN <karn@unix.ka9q.ampr.org>
DA03DC81 SAYS A40B96D9 => AVIEL D. RUBIN <rubin@faline.bellcore.com>

C7A966DD SAYS A07786A1 => BETSI <certify@bellcore.com>
A07786A1 SAYS A40B96D9 => AVIEL D. RUBIN <rubin@faline.bellcore.com>

C7A966DD SAYS 0DBF906D => JEFFREY I. SCHILLER <jis@mit.edu>
0DBF906D SAYS 90F11E09 => ROLAND HEDBERG <Roland.Hedberg@umdac.umu.se>
90F11E09 SAYS FE02A199 => LARS-JOHAN LIMAN < liman@sunet.se>
FE02A199 SAYS A7360529 => PETER R BIVESAND <PetBi@UNIT.LiU.SE>
A7360529 SAYS F5385CDD => ROBERT MALMGREN <rom@incolumitas.se>
F5385CDD SAYS 01717265 => ILJA HALLBERG <iha@incolumitas.se>
01717265 SAYS 20E76E5D => romig.1@osu.edu
20E76E5D SAYS 0F4C9775 => FUNET CERT <cert@cert.funet.fi>
0F4C9775 SAYS D5327CB9 => WIETSE VENEMA <wietse@wzv.win.tue.nl>
D5327CB9 SAYS A40B96D9 => AVIEL D. RUBIN <rubin@faline.bellcore.com>

C7A966DD SAYS C1B06AF1 => DEREK ATKINS <warlord@MIT.EDU>
C1B06AF1 SAYS 7DFF8533 => PETER HONEYMAN <honey@citi.umich.edu>
7DFF8533 SAYS A40B96D9 => AVIEL D. RUBIN <rubin@faline.bellcore.com>

C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>
```

FIG. 4E

```
C7A966DD SAYS A07786A1 => BETSI <certify@bellcore.com>
A07786A1 SAYS A40B96D9 => AVIEL D. RUBIN <rubin@faline.bellcore.com>

C7A966DD SAYS A07786A1 => BETSI <certify@bellcore.com>
A07786A1 SAYS A40B96D9 => AVIEL D. RUBIN <rubin@faline.bellcore.com>

C7A966DD SAYS AB2700B9 => ROSS ANDERSON <rja14@cl.cam.ac.uk>
4B2700B9 SAYS A8DA7A71 => THOMAS A. BERSON <berson@anagram.com>
A8DA7A71 SAYS A40B96D9 => AVIEL D. RUBIN <rubin@faline.bellcore.com>

C7A966DD SAYS 4D0C4EE1 => JEFFREY I. SCHILLER <jis@mit.edu>
4D0C4EE1 SAYS B1331439 => RANDY BUSH <randy@psg.com>
B1331439 SAYS 814DA955 => BILL FENNER <fenner@parc.xerox.com>
814DA955 SAYS F5123899 => DAVID BARR <barr@math.psu.edu>
F5123899 SAYS 898C77E1 => CHRIS R. LEWIS <clewis@ferret.ocunix.on.ca>
898C77E1 SAYS 7CA8336D => ANDREW MacPHERSON <Andrew.Macpherson@bnr.co.uk>
7CA8336D SAYS 7DFF8533 => PETER HONEYMAN <honey@citi.umich.edu>
7DFF8533 SAYS A40B96D9 => AVIEL D. RUBIN <rubin@faline.bellcore.com>

C7A966DD SAYS 32DD98D9 => VESSELIN V. BONTCHEV <bontchev@fbihh.informatik.uni-hambur
32DD98D9 SAYS AF36F84D => GEOFF SIMMONS <simmons@informatik.uni-hamburg.de>
AF36F84D SAYS 38D896A1 => NILS GOROLL <slink@schokola.de>
38D896A1 SAYS 1A3A7A4D => LARS FENNEBERG <lf@elemental.net>
1A3A7A4D SAYS DAAD2449 => JOACHIM BREU <J.BREU@CL-HH.COMLINK.DE>
DAAD2449 SAYS 8BF00D29 => FRANK PRUEFER <F.PRUEFER@LINK-L.cl.sub.de>
8BF00D29 SAYS 6CE93239 => CHRISTOPHER CREUTZIG <c.creutzig@bionic.zer.de>
6CE93239 SAYS 3F31BA55 => RENE MUELLER <rene@math.fu-berlin.de>
3F31BA55 SAYS D5327CB9 => WIETSE VENEMA <wietse@wzv.win.tue.nl>
D5327CB9 SAYS A40B96D9 => AVIEL D. RUBIN <rubin@faline.bellcore.com>
```

FIG. 4F

```
C7A966DD SAYS 4AAF00E5 => DAVE DEL TORTO <ddt@lsd.com>
4AAF00E5 SAYS DE3C5ECD => LAURENCE LUNDBLADE <lgl@qualcomm.com>
DE3C5ECD SAYS C22B8CD9 => JOHN W. NOERENBERG <jwn2@qualcomm.com>
C22B8CD9 SAYS 85197FB5 => JOHN GILMORE <gnu@cygnus.com>
85197FB5 SAYS B7B7C22D => THORSTEN LOCKERT <tholo@sigmasoft.com>
B7B7C22D SAYS A326CF89 => JIM DUNCAN <jim@perry.arl.psu.edu>
A326CF89 SAYS FC0C02D5 => EUGENE H. SPAFFORD <spaf@cs.purdue.edu>
FC0C02D5 SAYS A40B96D9 => AVIEL D. RUBIN <rubin@faline.bellcore.com>
```
---
```
C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>
```
---
```
C7A966DD SAYS 9D997D47 => PETER GUTMANN <pgut1@cs.aukuni.ac.nz>
9D997D47 SAYS DCB8D00F => MATTHIAS BRUESTLE <m@mbsks.franken.de>
DCB8D00F SAYS FCF20B7D => ULF MOELLER <um@c2.net>
FCF20B7D SAYS 981BE6AD => JEROME THOREL <jt@freenix.fr>
981BE6AD SAYS EBBB1B41 => OLLIVIER ROBERT <roberto@Keltia.Freenix.FR>
EBBB1B41 SAYS 0358FCBD => POUL-HENNING KAMP <phk@FreeBSD.org>
0358FCBD SAYS 81B2A779 => PAUL S. TRAINA <pst@freebsd.org>
81B2A779 SAYS 666D0051 => ASSAR WESTERLUND <assar@nada.kth.se>
666D0051 SAYS D5327CB9 => WIETSE VENEMA <wietse@wzv.win.tue.nl>
D5327CB9 SAYS A40B96D9 => AVIEL D. RUBIN <rubin@faline.bellcore.com>
```
---
```
C7A966DD SAYS 9C680151 => TOM PERRINE <tep@sdsc.edu>
9C680151 SAYS 09D3E64D => GREG ROSE <Greg_Rose@sydney.sterling.com>
09D3E64D SAYS 95ED61A1 => MARIO ZAGAR <mario.zagar@fer.hr>
95ED61A1 SAYS FCCC773D => SIMON KENYON <simon@itc.icl.ie>
FCCC773D SAYS 27A3A94D => EUROPEN CERTIFICATION AUTHORITY <ca@europen.org>
27A3A94D SAYS 7DFF8533 => PETER HONEYMAN <honey@citi.umich.edu>
7DFF8533 SAYS A40B96D9 => AVIEL D. RUBIN <rubin@faline.bellcore.com>
```

FIG. 4G

```
C7A966DD SAYS 7D63A5C5 => HAL ABELSON <hal@mit.edu>
7D63A5C5 SAYS 391C8DA5 => MATTEO FRIGO <athena@artemide.dei.unipd.it>
391C8DA5 SAYS 69163909 => MATTEO FRIGO <athena@theory.lcs.mit.edu>
69163909 SAYS E0FD2589 => KEVIN E. FU <fubob@mit.edu>
E0FD2589 SAYS D0105E1D => JERED J. FLOYD <jered@mit.edu>
D0105E1D SAYS 66CB73DD => CHRISTOPHER DAVIS (offline key) <ckd@kei.com>
66CB73DD SAYS FC0C02D5 => EUGENE H. SPAFFORD <spaf@cs.purdue.edu>
FC0C02D5 SAYS A40B96D9 -> AVIEL D. RUBIN <rubin@faline.bellcore.com>
```
---
```
C7A966DD SAYS A07786A1 => BETSI <certify@bellcore.com>
A07786A1 SAYS A40B96D9 => AVIEL D. RUBIN <rubin@faline.bellcore.com>
```
---
```
C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>
```
---
```
C7A966DD SAYS 0DBF906D => JEFFREY I. SCHILLER <jis@mit.edu>
0DBF906D SAYS E4E403F1 => STUART G. STUBBLEBINE <stubblebine@research.att.com>
E4E403F1 SAYS 74FCBE55 => MICHAEL K. REITER <reiter@research.att.com>
74FCBE55 SAYS A40B96D9 => AVIEL D. RUBIN <rubin@faline.bellcore.com>
```
---
```
C7A966DD SAYS 8DE722D9 => BRANKO LANKESTER <brank@hacktic.nl>
8DE722D9 SAYS 0679ED91 => teun.nijssen@kub.nl
0679ED91 SAYS FC0C02D5 => EUGENE H. SPAFFORD <spaf@cs.purdue.edu>
FC0C02D5 SAYS A40B96D9 => AVIEL D. RUBIN <rubin@faline.bellcore.com>
```
---
```
C7A966DD SAYS 0500BF45 => MICHAEL PAUL JOHNSON <mpj@csn.org> mpj8
0500BF45 SAYS 18239E91 => ROBERT C. CASAS <rc.casas@ix.netcom.com>
18239E91 SAYS CCEF447D => STALE SCHUMACHER <staalesc@ifi.uio.no>
CCEF447D SAYS 34D74DC1 => PETER SIMONS <simons@peti.rhein.de>
```

FIG. 4H

```
34D74DC1 SAYS 593238E1 => THOMAS ROESSLER <Thomas.Roessler@Sobolev.Rhein.DE>
593238E1 SAYS 7B7AE5E1 => GERMANO CARONNI <caronni@tik.ee.ethz.ch>
7B7AE5E1 SAYS 4413B691 => THOMAS LENGGENHAGER <lenggenhager@switch.ch>
4413B691 SAYS D5327CB9 => WIETSE VENEMA <wietse@wzv.win.tue.nl>
D5327CB9 SAYS A40B96D9 => AVIEL D. RUBIN <rubin@faline.bellcore.com>
```
---
```
C7A966DD SAYS 4B2700B9 => ROSS ANDERSON <rjal4@cl.cam.ac.uk>
4B2700B9 SAYS A8DA7A71 => THOMAS A. BERSON <berson@anagram.com>
A8DA7A71 SAYS A40B96D9 => AVIEL D. RUBIN <rubin@faline.bellcore.com>
```
---
```
C7A966DD SAYS A07786A1 => BETSI <cerify@bellcore.com>
A07786A1 SAYS A40B96D9 => AVIEL D. RUBIN <rubin@faline.bellcore.com>
```
---
```
C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>
```
---
```
C7A966DD SAYS A07786A1 => BETSI <certify@bellcore.com>
A07786A1 SAYS A40B96D9 => AVIEL D. RUBIN <rubin@faline.bellcore.com>
```
---
7-CONNECTED

FIG. 5A

 AT&T | Path Server | RESEARCH

Search Results

C7A966DD SAYS A07786A1 => BETSI <certify@bellcore.com>
A07786A1 SAYS A40B96D9 => AVIEL D. RUBIN <rubin@faline.bellcore.com>

---

C7A966DD SAYS 4B2700B9 => ROSS ANDERSON <rja14@cl.cam.ac.uk>
4B2700B9 SAYS A8DA7A71 => THOMAS A. BERSON <berson@anagram.com>
A8DA7A71 SAYS A40B96D9 => AVIEL D. RUBIN <rubin@faline.bellcore.com>

---

C7A966DD SAYS 4D0C4EE1 => JEFFREY I. SCHILLER <jis@mit.edu>
4D0C4EE1 SAYS 10E25B71 => MARSHALL ROSE <mrose@dbc.mtview.ca.us>
10E25B71 SAYS A87406A1 => J. PAUL HOLBROOK <holbrook@cic.net>
A87406A1 SAYS 7DFF8533 => PETER HONEYMAN <honey@citi.umich.edu>
7DFF8533 SAYS A40B96D9 => AVIEL D. RUBIN <rubin@faline.bellcore.com>

---

C7A966DD SAYS 8DE722D9 => BRANKO LANKESTER <branko@hacktic.nl>
8DE722D9 SAYS F00F0421 => cert-nl.master-certification-key
F00F0421 SAYS D5327CB9 => WIETSE VENEMA <wietse@wzv.win.tue.nl>
D5327CB9 SAYS A40B96D9 => AVIEL D. RUBIN <rubin@faline.bellcore.com>

---

C7A966DD SAYS 4AAF00E5 => DAVE DEL TORTO <ddt@lsd.com>
4AAF00E5 SAYS C053E51D => VINNIE MOSCARITOLO <vinnie@apple.com>
C053E51D SAYS 38D916D5 => MARSHALL CLOW <mclow@mailhost2.csusm.edu>
38D916D5 SAYS 540D8AB1 => SIG PORTER <sporter@electriciti.com>
540D8AB1 SAYS 955EC2C1 => PHIL KARN <karn@ka9q.ampr.org>
955EC2C1 SAYS E4E403F1 => STUART G. STUBBLEBINE <stubblebine@research.att.com>
E4E403F1 SAYS 74FCBE55 => MICHAEL K. REITER <reiter@research.att.com>

FIG. 5B

74FCBE55 SAYS A40B96D9 => AVIEL D. RUBIN <rubin@faline.bellcore.com>

---

C7A966DD SAYS DA0EDC81 => PHIL KARN <karn@unix.ka9q.ampr.org>
DA0EDC81 SAYS A40B96D9 => AVIEL D. RUBIN <rubin@faline.bellcore.com>

---

C7A966DD SAYS 9C680151 => TOM PERRINE <tep@sdsc.edu>
9C680151 SAYS F940AB85 => DANIEL V. KLEIN <dvk@lonewolf.com>
F940AB85 SAYS FC0C02D5 => EUGENE H. SPAFFORD <spaf@cs.purdue.edu>
FC0C02D5 SAYS A40B96D9 => AVIEL D. RUBIN <runbin@faline.bellcore.com>

METHOD FOR AUTHENTICATING A CHANNEL IN LARGE-SCALE DISTRIBUTED SYSTEMS

BACKGROUND OF THE INVENTION

The present invention relates generally to methods for authenticating a channel, and more particularly to a method for authenticating a channel in a large-scale distributed system.

Enforcing access controls in any computer system generally requires that sources of access requests (or more generally messages) be determined. In a computer system, a message is usually received on a channel, such as a network. Determining the set of principals (e.g., users, processes, or computers) that could have initiated that message is known as "authenticating the channel" (or request). Prior to acting on a request or forwarding a message, a computer system or operator usually wants to authenticate the channel.

The authentication process in centralized computer systems is simplified by the fact that there is a central authority (the operating system, or a security kernel thereof) that controls all channels and knows which principals can initiate requests on which channels. In a distributed system, however, typically no such central authority exists for this information. As the distributed system gets larger and more diverse, the difficulty of reliably authenticating a channel increases substantially. An in a system as large and diverse as the Internet, reliably authenticating a channel presents a heretofore impossibly complicated task.

As an example, consider a system in which the channel is the public key that can be used to verify the signature on the message, and authenticating the channel means determining the set of principals that could have generated that signature. Lacking a global authority on this information, the user is asked to defer to a "path" of channels $c_1, \ldots, c_k$ (i.e., other public keys) such that: (i) the user believes it can authenticate $c_i$, (ii) each $c_i$, $i<k$, has uttered a statement (a certificate) regarding for what principal $c_{i+1}$ speaks, and (iii) $c_k$ has uttered a statement regarding for what principal the channel of interest to the user speaks. If the user is willing to trust the statements of each channel on the pat then the user authenticates the target channel according to the statement that $c_k$ made about it.

This technique relies on a single path of channels. Relying on a single path of channels can be very unreliable, however, since it assumes trust in all intermediate channels on the path, and a single instance of misplaced trust can result in a false authentication of the target channel. That is, if any $c_i$ in the path provides a false statement regarding $c_{i+1}$, either accidentally or intentionally, then proper semantics for the target channel have not been achieved.

To attempt to solve the problem of gaining increased assurance in the authentication process, some have suggested using multiple paths of channels to overcome the single point of failure in the above approach. These path authentication methods assign numerical measures of trustworthiness to paths or collections of paths. These efforts also observe that shorter paths and multiple paths lend additional credibility to the authentication of a channel, and the derived numerical measures tend to reflect those observations. Yet, these efforts do not disclose how to find the paths for use as input to the evaluation functions, but merely that doing so will improve the authentication process.

Methods exist for locating a single path to a channel, but in so doing they assume a known "topology" regarding what channels make statements about others. Other path authentication methods for finding a single path to a channel exhibit exponential worst-case complexity as a function of the number of channels and statements. Thus, known path authentication methods either do not look beyond a single path, assume a known topology on the relationships between channels or suffer from exponential complexity as the number of channels and statements increases.

N. McBurnett, "PGP Web of Trust Statistics," which can be found at http://bcn.boulder.co.us/~neal/pgpstat/, 1996, is an effort to gather statistics about the graph of channels (i.e., public keys) induced by PGP certificates worldwide. This work focuses on characterizing the structure of the graph, and in particular identifying its strongly-connected components, determining mean and maximum shortest path distances between channels, and identifying channels in the graph that are central to its connectivity. While useful, this work is unable to increase the assurance in authentication of any channel of interest, but rather simply characterizes the graph and cannot locate paths of channels.

One known technique for increasing the assurance in channel authentication is to limit the length of the path used, thereby limiting the number of intermediate principals that must be trusted. While this technique increases the assurance, by itself it is not sufficient to achieve the desired levels of assurance since it maintains the single point failure of the earlier mentioned systems.

A second known technique for increasing the assurance in channel authentication is to employ multiple paths, and to authenticate the target channel based upon information obtained via each of these paths. As in the above, by itself this technique cannot provide the desired levels of assurance because there is no guarantee that the same single point failure does not appear in multiple paths, thereby providing a false sense of security.

The present invention is therefore directed to the problem of developing a method and system for reliably authenticating a channel in a large distributed system, such as the Internet, which does not assume a known topology of the system and does not exhibit exponential worst case complexity.

SUMMARY OF THE INVENTION

The present invention solves this problem by using multiple "independent" and bounded paths in the authentication process. To ensure that the multiple paths are independent, the present invention requires them to be disjoint, i.e., to share no intermediate channels. By so doing, the present invention prevents the proliferation of a single point failure throughout the authentication process. Combining the disjointedness of the channels with the bounded length limit results in a reliable system for authenticating channels.

According to the present invention, a method for authenticating a channel in a large distributed system, includes determining a set of independent paths by which the channel could have been authenticated, each of which of length at most a predetermined value, and using the paths determined to authenticate the channel. In this case, it has been found to be particularly advantageous if the set of independent paths comprises a set of disjoint paths. In the method of the present invention, voting among the paths can be either by mere plurality, by supermajority or by unanimous vote before the channel is declared to be authentic.

According to the present invention, another method for authenticating a target channel (t) using a source channel (s) in a large distributed system includes modeling the large distributed system as a graph, determining a plurality of bounded disjoint paths from the source channel (s) to the target channel (t) by:

(i) finding a path from the source (s) channel to the target channel (t) of length at most b that intersects a fewest number of other paths from the source channel (s) to the target channel (t) of at length at most b;
  (ii) adding the path found in (i) to the plurality of bounded disjoint paths being determined previously;
  (iii) deleting the path added in (ii) along with all incident edges from a graph of the large distributed system; and
  (iv) repeating (i) through (iii) until no more paths can be found in (i).

In this embodiment of the method of the present invention, three separate techniques for finding the path in (i) are used. First, one can choose the path in (i) that is the shortest path from the source channel (s) to the target channel (t) with a length less than b.

Alternatively, one can choose the path in (i) based on its degree. That is, one can select a path from the source channel (s) to the target channel (t) with a length less than b having a smallest degree, wherein the degree of the path is a sum of a degree of each node in the path, and the degree of a node equals a number of edges incident on the node.

Finally, a path can be selected randomly. This can be accomplished by assigning a random weight to each node in the graph, and then defining a weight for each path based on some function of the weights of the nodes in the path. One possibility is to define the path weight as the sum of the random weights of the nodes in the path. The path is then determined by generating a random number and selecting the path whose weight matches the random number.

According to the present invention, a web server for providing a plurality of bounded disjoint paths for use in authenticating a target channel (t) using a source channel (s) in a large distributed system includes means for interfacing with a user to accept a source channel (s) and a target channel (t) specified by the user, means for modeling the large distributed system as a graph, means for determining a plurality of bounded disjoint paths from the source channel (s) to the target channel (t), and means for outputting the plurality of disjoint paths from the source channel (s) to the target channel (t) upon request by a user. The means for determining finds a path from the source (s) channel to the target channel (t) of length at most b that intersects a fewest number of other paths from the source channel (s) to the target channel (t) of at length at most b, adds the path found to the plurality of bounded disjoint paths being determined, deletes the path added along with all incident edges from a graph of the large distributed system, and repeats this process until no more paths can be found. In this case, the same three techniques discussed above can be used by the determining means to find the path.

In sum, the present invention provides algorithms and tools to efficiently locate as many independent paths as possible, which can serve as input to functions for evaluating assurance in the authentication provided by paths of channels, such as those functions that assign numerical measures of trustworthiness to paths or collections of paths. The present invention looks beyond a single path to locate as large a set of bounded disjoint paths as possible, without suffering exponential complexity and without assuming a known topology on the relationships between channels. Consequently, channel assurance can be increased significantly without concomitantly increasing the complexity of the calculations.

BRIEF DESCRIPTION OF THE DRAWINGS

FIG. 2 depicts Table 3, which indicates the graphs used in testing the present invention.

FIG. 3 depicts Table 4, which indicates the accuracy results of the various algorithms of the present invention for multiply connected pairs.

FIGS. 4A–H depict the search results for connective paths from source channel C7A966DD to target channel A40B96D9 with a path bound of ten in textual format.

FIGS. 5A–B depict the search results for disjoint paths from source channel C7A966DD to target channel A40B96D9 with a path bound of ten in textual format

DETAILED DESCRIPTION

Figure 1:
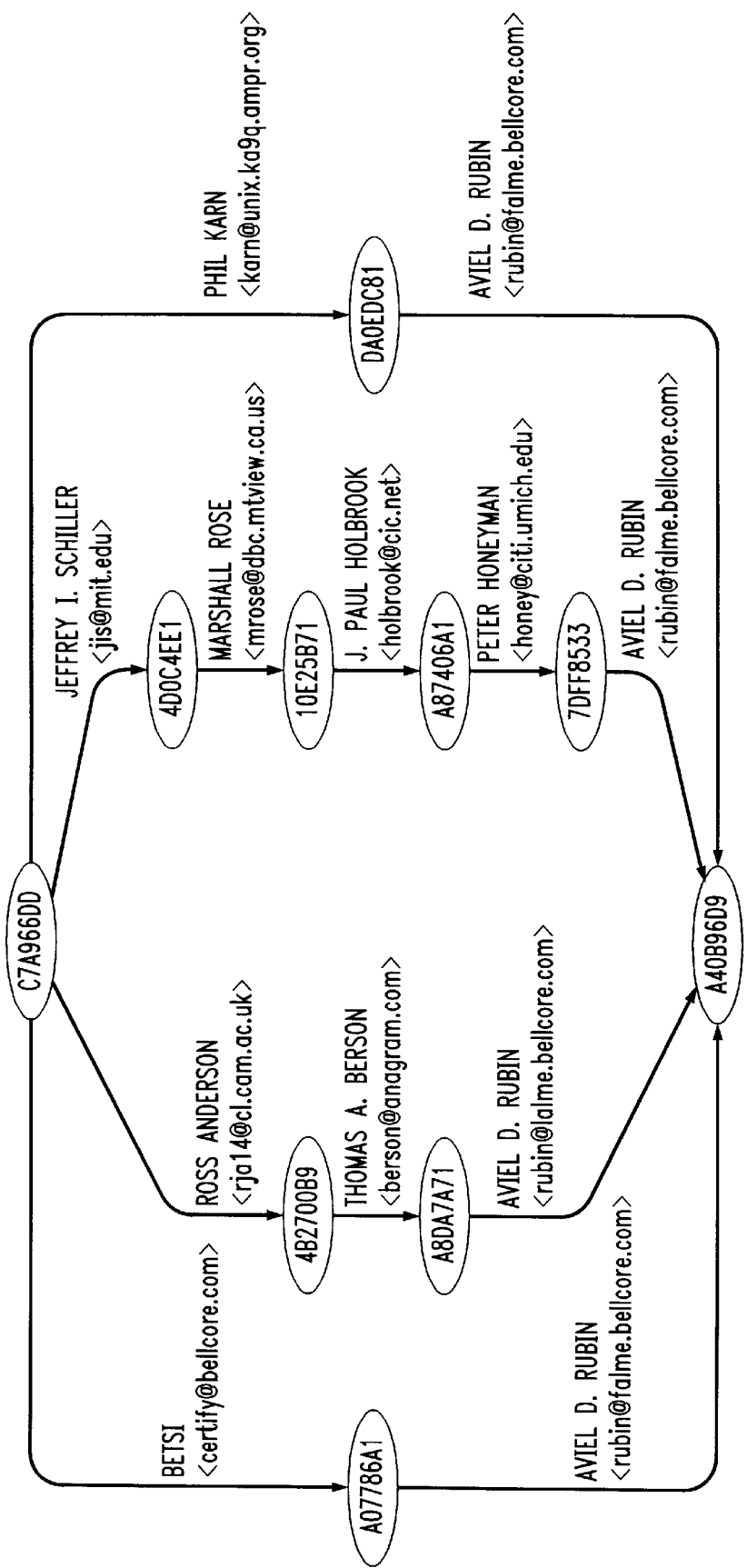
FIG. 1 depicts a graphical output of one embodiment of the present invention, called PathServer.

The present invention includes a method for authenticating a channel by using bounded independent paths and using information from each of these paths as input to the decision process. In addition, the present invention includes algorithms for approximating the bounded independent (or disjoint) paths, as the exact solution is NP-hard. Finally, the present invention includes a Web server that provides a set of bounded independent paths upon request.

First, however, we explore what it means for multiple length-bounded paths to be independent in the context of channel authentication. In so doing, we focus on two related notions of independence:

1. A set of bounded paths are "independent" if they are pair-wise disjoint, i.e., if no two paths share a common channel. We call this a set of bounded disjoint paths. Bounded disjoint paths are appealing because no channel is relied on multiple times in the authentication of the target channel.
2. A set of bounded paths are "independent" if the removal of k channels is necessary to disconnect all of them. This is known as a set of bounded k-connective paths. Bounded k-connective paths are robust to the compromise of any k−1 channels: if some k−1 channels are compromised and thus the statements they contribute are forgeries (and should thus be disregarded), there still is a bounded path containing none of these compromised channels to the target channel. Note that a set of k bounded disjoint paths is a set of k-connective paths, but in general a set of bounded k-connective paths will not be disjoint.

PathServer

One embodiment of the present invention includes a World-Wide-Web service, called PathServer, for finding bounded disjoint or connective paths from a source channel to a target channel. PathServer is a service that helps enable one to have secure communications on the Internet. A basic tool for facilitating secure communications in environments like the Internet is public key cryptography, which enables each user to have a public key, which the user can distribute widely, and a private key that the user keeps to herself. The user can sign messages in a way that anyone with her public key can verify that she sent the message, and anyone with her public key can encrypt messages so that only she can decrypt them. PathServer is a tool to help users to determine to whom a public key belongs, i.e., to authenticate the key.

This embodiment of PathServer is integrated to work with Pretty Good Privacy (PGP), an existing public key management and encryption package. PathServer takes as input the PGP identifiers of a key the user trusts, called the trusted key, and a key the user wants to authenticate, called the query key. PathServer returns an active graphical representation of paths from the trusted key to the query key, such as shown in FIG. 1. Alternatively, PathServer can return a text version, an example of which is shown in FIGS. 4A–H and 5A–B. These were generated by using the source and target keys used in FIG. 1 with a path bound of 10. Note that selecting connective paths versus disjointed paths results in a larger number of paths. This is because the definition of disjoint is more restrictive than connective.

Each path in the graph represents a set of signed certificates. Each certificate in the path certifies who owns the public key it contains, and its signature can be verified by the public key in the preceding certificate on the path, in PGP parlance, this verifying key is acting as an "introducer." Graphically, each certificate is depicted as an edge from the verifying key to the certified key and is labeled by the identity that was bound to the certified key in the certificate. Each path ends at the query key, and so you can compare what different people say about to whom the query key belongs.

PathServer allows the user to specify attributes about your own policy for authenticating keys. Once such attribute is a "path bound." Returned paths are of length shorter than the specified path bound; in general, paths with many introducers are less trustworthy. Other types of interesting policies are "disjoint paths" and "connective paths." When the "disjoint" option is selected on the query form, the paths returned by PathServer are disjoint, in that they share no intermediate keys (introducers). So, no single key is relied upon multiple times for information regarding the query key. When the "connective" option is selected, PathServer returns a set of paths and a number k (located at the bottom of the output) with the property that even if k−1 nodes are compromised and thus there emanating edges are forgeries, there remains a path of uncompromised keys from the trusted key to the query key with length at most the desired path bound.

PathServer works in the context of the PGP key management system, although it is easily adaptable to other types of public key management systems. PathServer can be currently found at the world wide web site http://www.research.att.com/~reiter/PathServer.

PGP is the most popular civilian public key system in the world today, due in no small part to the decentralized model of trust it supports. In PGP, users create signed certificates (statements) that bind semantics (e.g., a name and an email address) to a public key. These statements, which taken together form a graph that can be disseminated through personal communications, on electronic newsgroups, or, as is often the case, via a number of PGP servers spread across the world. Authentication of a message—i.e., of the public key (channel) that signed (stated) it—takes place as described above, with a user finding a path of channels by which it can authenticate the channel of interest. PGP allows a user to specify a bound on the length of paths she is willing to accept. PGP also provides primitive support for using multiple paths. More precisely, it provides interfaces to specify keys as being "completely" or "marginally" trusted for certification, and for specifying how many completely trusted or marginally trusted signatures are required to authenticate a channel.

PGP lacks, however, the ability to search for all independent information about a key that is likely to be useful to the requesting party. As an adjunct to the method of the present invention, i.e., that the appropriate information to provide is disjoint or connective paths of bounded length from a channel that the requesting principal trusts to the channel of interest, PathServer provides this information.

PathServer provides a World Wide Web interface by which a user can submit a path length bound, PGP identifiers for a source key (e.g., her own) and a target key, and a choice of disjoint or connective paths, and will receive in real time a display of the requested paths. An example is shown in FIG. 1, which is the result of specifying disjoint paths of length at most eight with a source key identifier of C7A966DD and a target key identifier of A40B96D9. The service generates this information using a graph built from a database of PGP certificates, which PathServer updates periodically from other PGP key servers throughout the world.

It is important to note that PathServer need not be trusted; a user can verify the information retrieved from PathServer by retrieving the appropriate certificates from any PGP database (including PathServer) and verifying for herself that the paths exist using the existing PGP program. Thus, the information retrieved from PathServer can merely be considered as hints to enable independent corroboration of the semantics associated with a given target key.

PathServer supports authentication of PGP public keys using the bounded disjoint paths and the bounded connective paths paradigms of the present invention. If bounded disjoint paths are requested, PathServer locates a set of such paths from the requesting principal (or more precisely, a channel that is known to speak for it) to the target channel in its database of PGP certificates (a "keyring" in PGP parlance). If bounded connective paths are requested, PathServer returns a value k and a set of bounded k-connective paths from the requesting principal to the target channel. Though PathServer currently supports only PGP, the present invention can be applied to other public key management systems (e.g., those based on X.509) as well as to systems that employ other types of channels (e.g., shared keys, protected physical links, or a combination of these).

There are a number of PGP key servers spread across the world. While PathServer can be used as a key server, it also does things that other key servers do not. In particular, its support for locating a set of disjoint or connective paths from a key the user trusts to a key about which the user wants to know, subject to the user's constraints on the length of each path. PathServer enables the user to query a consolidated PGP key server database for evidence that keys satisfy the user's policy for authenticating keys.

PathServer interfaces with most standard browsers. PathServer employs frames to present its graphical output and therefore the browser needs to support frames. For those browsers that do not support frames, but do support text, the text output option enables the user to receive the output shown in FIGS. 4A–H and 5A–B.

If the user does not want to trust the results returned by PathServer, the user can select the output in "ASCII-armored" block format containing the keys and signatures represented by the graph. The user can then verify the signatures locally using PGP.

PathServer maintains a database of PGP certificates that is updated periodically from several other POP key servers throughout the world.

While the inventors' experience with PathServer suggests that these independence concepts are useful in bolstering assurance in authentication, they also have certain limitations. For example, the complexities of finding a maximum set of bounded disjoint paths (i.e., a set of largest cardinality) and of finding the maximum k for which there exists a set of bounded k-connective paths provide strong evidence that neither can be performed in polynomial time. Specifically, the former is NP-hard and the latter is coNP-hard. Moreover, the foremost practical instances of these problems that we are targeting (i.e., public key certification systems such as PGP) induce graphs of sufficient size to make this a severe limitation. We thus propose efficient heuristics to approximate solutions to these problems.

System

Our system consists of a set of principals (e.g., people, machines, roles), some of which are channels (e.g., network addresses or encryption keys). Channels are the only principals that can make statements directly. For the purposes herein, the only statements that we consider are statements of the form "$c_1$ says $c_2 \Rightarrow P$" where $c_1$ and $c_2$ are channels, P is a principal, and $\Rightarrow$ denotes the "speaks for" relation. Intuitively, $c_2 \Rightarrow P$ means that if a statement emanates from $c_2$ (i.e., c "says" the statement), then the statement can be treated as if P said it. $c_1$ says $c_2 \Rightarrow P$ is then $c_1$'s statement that this is true.

We model our system with a directed graph $G=(V, E)$, where V is a finite set of channels and E is a finite set of edges denoting statements of the form described above. The statement $c_1$ says $c_2 \Rightarrow P$, where $c_1, C_2 \epsilon V$, is represented by an edge $$c_1 \overset{P}{\to} c_2$$

in E, which we often abbreviate by $c_1 \to c_2$ when P is not important. We represent multiple statements $$c_1 \overset{P_1}{\to} c_2, \ldots, c_1 \overset{P_k}{\to} c_2$$

made by the same channel $c_1$ about the same channel $c_2$ by a single statement $$c_1 \overset{P_1 \wedge \ldots \wedge P_j}{\to} c_2$$

This graph is perhaps most easily pictured in the context of a "web" of public keys. In this case, V would be a set of public keys, and E would be a set of certificates. Nevertheless, the graph can be interpreted to include any channels and appropriate statements.

The problem at hand is for a principal to derive the meaning of a particular channel $t \epsilon V$ of interest, called the target. For simplicity, we assume that the principal has sole control of some channel $s \epsilon V$, called the source, and that any statements that the principal is willing to utter regarding other channels are represented by edges in E emanating from s. We also assume that the principal has access to the entire graph G.

One aspect of the present invention is that disjoint paths from s to t, each of at most some specified length, can help the principal to authenticate t. More precisely, a path from s to t in G is a sequence of edges $$s \to c_1 \to \ldots \to c_l \to t$$

for some $l \geq 0$ where each $c_i \notin \{s, t\}$ and where $i \neq j$ implies $c_i \neq c_j$. The length of a path $$s \to c_1 \to \ldots \to c_l \to t$$

is l, and a path is b-bounded if its length is at most b. In our first interpretation of "independent," we employ disjoint paths. More precisely, two paths from s to t, say $$s \to c_1^1 \to \ldots \to c_{l_1}^1 \to t$$

and $$s \to c_1^2 \to \ldots \to c_{l_2}^2 \to t$$

are disjoint if $$c_i^1 \neq c_j^2$$

for all i, $1 \leq i \leq l_1$, and all j, $1 \leq j \leq l_2$. With these definitions, our problem becomes the following:

Bounded Disjoint Paths

Thus, with the above directed graph G, distinguished nodes s and t, and a path bound b, we would like to determine the maximum set of mutually disjoint paths from s to t, each of length at most b.

To capture our second notion of "independence," we say that a set D of paths from s to t, where $s \to t \notin D$, is k-connective if the smallest subset of $V \backslash \{s, t\}$ that intersects every path in D is of size k. That is, the paths in D are k-connective if it is necessary to remote k nodes (other than s and t) to disconnect them all. The b-connectivity from s to t is the maximum k for which a set of b-bounded k-connective paths from s to t exists (with the edge $s \to t$ removed if it exists).

Our second problem then becomes as follows.

Bounded Connective Paths (BCP)

For a directed graph G, distinguished nodes s and t, and a path bound b, we must determine the b-connectivity from s to t, say k, and a set of b-bounded k-connective paths from s to t.

Note that if $s \not\to t$, then any k-disjoint b-bounded paths from s to t are k-connective, but in general a set of b-bounded k-connective paths from s to t are not disjoint.

Though we contend that solutions to BDP and BCP can be useful in supporting authentication of a target channel, it is up to the individual users' policies to determine exactly how they are used. Given a set of disjoint or connective paths:

$$s \to c_1^1 \to \ldots \to c_{l_1}^1 \overset{P_1}{\to} t$$

$$s \to c_1^2 \to \ldots \to c_{l_2}^2 \overset{P_2}{\to} t$$

$$\vdots$$

$$s \to c_1^j \to \ldots \to c_{l_j}^j \overset{P_j}{\to} t$$

the requesting principal might authenticate t by, e.g., requiring consensus among the paths, i.e., that $P_1 = P_2 = \ldots = P_j$. If there exists $P_i$, $P_j$ that are different then this indicates a discrepancy in what different paths reported about t that must be resolved by the requesting principal's policy (e.g., adopting a $P_i$ common to k+1 disjoint paths overcomes k-compromised channels).

Finding bounded disjoint paths

The following is an algorithmic consideration of the Bounded Disjoint Paths (BDP) problem discussed above. BDP has been previously studied from a complexity-theoretic point of view, and has been proved to be NP-hard. More precisely, BDP remains NP-hard for any fixed $b \geq 4$, but it can be solved in $O(m\sqrt{n})$ time on a graph with n nodes and m edges if b<4 using maximum matching and maximum flow techniques. It is interesting to note that the related problem of finding n requested number of disjoint paths of minimum total length can be solved in polynomial time.

Thus, there is little hope of finding an efficient solution to BDP, and we turn to finding approximation algorithms for this problem. By an "approximation algorithm," we intuitively mean an efficient algorithm that usually comes close to the actual answer.

Prior work on approximation algorithms for BDP was performed by Ronen and Perl. See D. Ronen and Y. Perl, "Heuristics for Finding A Maximum Number of Disjoint Bounded Paths," *Networks*, 14:53 1–544, 1984. They proposed an algorithm and showed empirically that it performs well on small random undirected graphs of 50 nodes. Their algorithm runs well in $O(b^2n^2m)$ time and $O(b^2nm)$ space with a path bound b on a graph with n nodes and m edges.

The class of algorithms that we describe in this section is much simpler than that by Ronen and Perl, and offers superior time and space complexity. In one instance, our algorithm runs in $O(nm)$ time and $O(n+m)$ space. Another runs in $O(bnm+bn^2 \log(bn))$ time and $O(bn+m)$ space. In order to motivate our algorithms, we first present another algorithm that runs in $n^{O(b)}$ time and space, and thus is exponential in b. While we introduce this first algorithm primarily for motivational purposes, it can be argued to be "efficient" in the following senses. First, if $P \neq NP$, then there is no algorithm for solving BDP exactly that is polynomial in n, since BDP remains NP-hard for any fixed $b \geq 4$, as shown by Itai, Perl and Shiloach. Put another way, a user that always chooses a fixed bound $b \geq 4$ will observe polynomial growth in the running time of this algorithm as a function of the graph size, whereas there is no known algorithm that can solve BDP exactly for a fixed $b \geq 4$ and provide polynomial growth as a function of graph size if $P \neq NP$. Second, we expect that in most cases the size of b that users desire will be reasonably small.

Let bdp(G, b, s, t) denote the cardinality of a maximum set of disjoint paths from s to t of length at most b in graph G=(V, E). Each of the algorithms A that we present here produce a set with cardinality A(G, b, s, t) of disjoint paths from s to t of length at most b, where (i) $A(G, b, s, t) \leq bdp(G, b, s, t)$, and (ii) if $bdp(G, b, s, t) > 0$, then $A(G, b, s, t) > 0$.

The first of these properties (which is also required by the definition of an approximation algorithm, as shown by Garey and Johnson), indicates that our algorithms are fail-secure, in the sense that they will never return a set of paths from a source channel s to a target channel t that exaggerates the actual maximum set of disjoint paths from s to t. In addition to the above properties, each algorithm uses heuristics to search for a maximum set of paths. Below we give empirical evidence that our algorithms perform well on one type of interesting graph. However, this data also indicates that the error of our algorithms is not constant, but rather increases as a function of problem size. The following theorem provides a small amount of justification.

Theorem 1 If $P \neq NP$, then no polynomial approximation algorithm A for BDP can guarantee $bdp(G, b, s, t) - A(G, b, s, t) \leq K$ for a fixed constant K Proof: (sketch) Suppose for a contradiction that there is such an algorithm A and constant K. We use A to construct a polynomial time algorithm for solving BDP exactly. Consider a problem instance (G=(V,E), b, s, t), and assume without loss of generality that $s \not\to t$ and that K is an integer. The algorithm constructs a new problem instance (G', b, s, t) where G' consists of K+1 "copies" of G with the exception that s and t are represented in G' only once. That is, the nodes for G' are $$V' = \{s, t\} \cup \left[ \bigcup_{c \in V' \setminus \{s,t\}} \{c[1], \ldots, c[K+1]\} \right]$$

and the edge set E' is defined by $$E' \ni \begin{cases} c_1[j] \to c_2[j](1 \leq j \leq K+1) \text{ if } c_1, c_2 \notin \{s, t\} \text{ and } c_1 \to c_2 \in E \\ s \to c[j](1 \leq j \leq K+1) \text{ if } s \to c \in E \\ c[j] \to t(1 \leq j \leq K+1) \text{ if } c \to t \in E \end{cases}$$

G' can be constructed in polynomial time, since K is fixed.

Note that bdp(G', b, s, t)=(K+1) bdp(G, b, s, t). Moreover, an exact solution to BDP on the instance (G, b, s, t) can be obtained by running A on (G', b, s, t) and taking the largest subset of paths that A selected from any single copy of G, since A can find less than a maximum set of paths on at most K copies of G.

Independent set

The first approximation algorithm for BDP that we present was influenced by work on approximation algorithms for a different problem, called Maximum Independent Set (MIS). The MIS problem begins with an undirected graph G=(V, E) and attempts to find a set $V' \subseteq V$ of largest cardinality such that no two vertices in V' are joined by an edge in E.

Any set $V' \subseteq V$ such that no two vertices in V' are joined is said to be an independent set. Such a set V' of largest cardinality is said to be a maximum independent set.

MIS is a well-known NP-hard problem. Table 1 presents a simple known approximation algorithm for this problem. Intuitively, this algorithm constructs an approximately maximum independent set by repeating the following step: find the node v with the smallest degree (i.e., that has the fewest neighbors), add v to the independent set, and delete v and all neighbor vertices from the graph. Choosing the node with the smallest degree minimizes the number of candidate nodes eliminated by each choice of node to include in the independent set.

TABLE 1

Johnson's approximation algorithm for
MIS on undirected graph G = (V, E)

1. Set I = 0 and U = V.
2. Let v be the node in U with the minimum degree in the subgraph induced by U. Set I = I ∪ {v} and U = U\
   ({v} ∪ {u ∈ U: (v, u) ∈ E}).
3. If U = 0, then halt and return I. Otherwise, go to 2.

This approximation algorithm for MIS suggests the following approximation algorithm for BDP. Given an instance (G, b, s, t) of BDP, we construct an undirected graph $\hat{G}$ whose nodes denote paths from s to t of length at most b in G, and where two nodes in $\hat{G}$ are connected if and only if the paths they represent in G are not disjoint. Since there is a one-to-one correspondence between independent sets in $\hat{G}$ and sets of disjoint paths from s to t of length at most b in G, we can employ Johnson's algorithm on $\hat{G}$ to find an approximate solution to the BDP problem on G. It is instructive to note that by applying Johnson's algorithm to $\hat{G}$ we are choosing paths from s to t in G that intersect the fewest other paths from s to t.

The proof of Johnson, Theorem 3.1 shows that the algorithm in Table 1 is guaranteed to find an independent set of size at least $|\log_k \hat{n}|$ in any undirected graph $\hat{G}=(\hat{V}, \hat{E})$, where $\hat{n}=|\hat{V}|$ and k is the smallest integer such that $\hat{V}$ can be partitioned into k independent sets (and thus the size of the maximum independent set is at least $|\hat{n}/k|$. We obtain the analogous result for BDP as a corollary, i.e., where $\hat{n}$ is the number of paths from s to t of length at most b. While this guarantee is weak, the algorithm seems to perform much better in practice, as we show below.

The dominant cost in this algorithm is constructing $\hat{G}$, which requires $n^{O(b)}$ operations and space if G=(V, E) and $|V|=n$. As we argued previously, growth that is exponential in b need not necessarily be a limiting factor for the applications that we are considering. Nevertheless, in the following section we explore algorithms whose complexity grows polynomially in both n and b. Next, we refer to the algorithm of this section as the Independent Set Algorithm.

Approximating the Independent Set algorithm

The algorithms we present in this section can be viewed as algorithms that approximate the behavior of the Independent Set algorithm of the previous section. Recall the intuition behind that algorithm: at each step, choose the path from s to t that intersects the fewest other paths. The main cost in that algorithm is determining how many other paths that each path intersects; this is precisely the information contained in the undirected graph $\hat{G}$. So, a natural direction to speeding up this approach is to avoid this determination explicitly, and to use other information to indicate at each step the path that is likely to intersect the fewest other paths.

Given an instance (G=(V, E), b, s, t) of BDP, our algorithms then will proceed to efficiently find a path from s to t of length at most b that we have reason to believe will intersect the fewest other paths from s to t of length at most b. We will add this path to the set of disjoint paths we are generating, delete it and all incident edges from the graph, and repeat. For the moment we abstract the function we use to choose a path as an evaluation finction $\Phi(p)$ on paths p; i.e., we choose the path p that minimizes $\Phi(p)$. Thus, our algorithm executes as shown in Table 2.

TABLE 2

Approximate Algorithm for BDP on instance of (G = (V,E), b, s, t)

1. Set U = V and
$$D = \left\{ \begin{array}{ll} \{s \to t\} & \text{if } s \to t \in E \\ 0 & \text{otherwise} \end{array} \right\}$$
2. Find a path
$p = s \to c_1 \to \ldots \to c_l \to t, 1 \leq l \leq b$
in the subgraph induced by U such that $\Phi(p)$ is the minimum over all such paths. If no such path exists, then halt and return D.
3. Set
$.D = D \cup \{p\}$ and $U = U \setminus \{C_1, \ldots, c_l\}$
and go to 2.

We next consider the following evaluation functions for locating a path that is "likely" to intersect the fewest other paths.

1. Length: In each iteration of the algorithm, choose the path from s to t of shortest length (in the range [1, ..., b]); i.e., $\Phi(p)$ is the length of p. Intuitively, shorter paths have fewer nodes to share with other paths, and thus should be likely to intersect fewer other paths. The shortest path from s to t can be found in O(m) time using breadth-first search, where m=|E|.

2. Degree: For a path $$p = s \to c_1 \to \ldots c_l \to t$$

the degree of p is defined as $$deg(p) = \sum_{1 \leq i \leq l} deg(c_i)$$

where the $deg(c_i)$ denotes the degree of (i.e., the number of edges incident on) $c_i$. In each iteration of the algorithm, choose the path from s to t of length at most b with the smallest degree. Thus, $\Phi(p)=deg(p)$. Intuitively, paths with lower degree offer fewer opportunities for other paths to cross them. The path of length at most b from s to t with the smallest degree can be found in O(bm+bn log(bn)) time where n=|V| and m=|E|, using a variation of Dijkstra's shortest path algorithm.

3. Random: Prior to executing the algorithm of Table 2, assign a random weight w(c) to each c∈V Define the weight of a path $$p = s \to c_1 \to \ldots \to c_l \to t$$

as $$w(p) = \sum_{1 \leq i \leq l} w(c_i)$$

Then, let $\Phi(p)=w(p)$. There is little intuition as to why this choice of b should yield a path that intersects few other paths, and it is included primarily as a point of comparison for our empirical evaluation. The path p minimizing $\Phi(p)$ can be found in O(bm+bn log(bn)) time, using a similar variation of Dijkstra's shortest path algorithm.

Unlike the Independent Set algorithm, the algorithm of Table 2, combined with any of the choices of $\Phi(p)$ described above, can offer no nontrivial guarantee of the cardinality of the set of disjoint paths that it will locate. This is because for any of these choices for $\Phi$, it is possible to construct classes of graphs that will foil this algorithm (in the case of Random, almost all of the time), causing it to return a set of disjoint paths of cardinality at most one for some s and t regardless of the actual number of disjoint paths there are from s to t.

The advantage of this algorithm, however, is its efficiency. Since each execution of Step 3 removes at least one node from U, Step 2 can be executed at most n=|V| times. Thus, the algorithm instantiated with $\Phi(p)$ being the length of p (Length) runs in O(nm) time. If $\Phi(p)=deg(p)$ (Degree) or $\Phi(p)=w(p)$ (Random), then the algorithm runs in O(bnm+ $bn^2$ log(bn)) time.

Empirical results

Motivated by our PathServer application, we performed tests on the approximation algorithms to evaluate their accuracy on a number of different graphs. In order to measure their accuracy, for each test graph and for every ordered pair of nodes in the graph, we computed the number of disjoint paths from the first node to the second, both in actuality and according to each approximation algorithm.

As the basis for the graphs in our tests, we used the PGP keyring held at the MIT PGP Key Service (pgp-public-keys@pgp.mit.edu) as of Nov. 21, 1995. This key ring induces a graph consisting of 13,896 non-trivial edges (i.e., edges of the form c1→c2 for c1≠c2 and 7,529 non-trivial nodes (i.e., nodes with incident non-trivial edges). Due to the size of this graph, it was not possible to evaluate the accuracy of our approximation algorithms on the entire graph. Doing so would require us to compute the actual number of disjoint paths between each pair of nodes, which is an exponential computation that far exceeds our resources for a graph of this size.

In an effort to evaluate the accuracy of our algorithms despite this hurdle, and also to learn how our algorithms performed as a function of graph size, we used various subgraphs induced by selecting (non-trivial) edges randomly from the total graph at random. In the remainder of this section, let $G_n$ denote the subgraph that resulted by selecting each edge from the whole graph with probability n/100. Some statistics for graphs we used are shown in Table 3 (see FIG. 2). This table characterizes the error of each algorithm. For each graph $G \in \{G_5, G_{10}, G_{15}, G_{20}, G_{25}, G_{30}, G_{40}\}$, each path bound $b \in \{5, 10, 15\}$ (b$\in\{5, 10\}$ for $G_{25}$ and b=5 for $G_{30}, G_{40}$), and each algorithm $A \in \{$Independent Set, Length, Degree, Random$\}$, we compute the following values:

err: amount all pairs $\{s, t\}$ such that bdp (G, b, s, t)$\geq$2, the fraction for which A(G, b, s, t)$\neq$bdp(G, b, s, t) (recall that bdp (G, b, s, t)=A(G, b, s, t) if bdp (G, b, s, t)$\leq$1);

avg: for all $\{s, t\}$ such that A(G, b, s, t)$\neq$bdp(G, b, s, t), the average value of bdp(G, b, s, t)–A(G, b, s, t);

max: for all (s, t) such that A(G, b, s, t)$\neq$bdp (G, b, s, t), the maximum value of bdp(G, b, s, t)–A(G, b, s, t).

Equations for each of these values is given below, where i=undefined (division by zero):

$$M = \{(s, t) : A(G, b, s, t) \neq bdp(G, b, s, t)\}$$

$$err = \frac{|M|}{|\{(s, t) : bdp(G, b, s, t) \geq 2\}|}$$

$$avg = \frac{\left[\sum_{(s,t) \in M} bdp(G, b, s, t) - A(G, b, s, t)\right]}{|M|}$$

$$max = \max_{(s,t) \in M} \{bdp(G, b, s, t) - A(G, b, s, t)\}$$

Note that these measures pertain only to those pairs of nodes that are multiply connected, which according to Table 3 (see FIG. 2) is the vast minority of node pairs. On the remaining vast majority of node pairs, each of the algorithms is guaranteed to return a true maximum set of disjoint paths (of cardinality zero or one).

While Table 4 (see FIG. 3) is inconclusive, some trends seem to emerge. First, and not surprisingly, Independent Set seems to be more accurate than any of the other algorithms. Second, Degree seems to become more accurate than Length and Random as the graph size increases. Setting aside Random (it is slower than Length and no more accurate), it appears that we can rank the algorithms on accuracy in the order Independent Set, Degree, Length. On the other hand, these algorithms are ranked in terms of performance in exactly the opposite order (and our empirical observations support this ordering), with Independent Set becoming costly quickly as a function of b. For Path Server, we therefore typically use the Degree algorithm as a good balance between accuracy and interactive performance.

Another observation that we can make from Table 4 (see FIG. 3) is that when our Length, Degree, and Independent Set algorithms erred, they usually missed a maximum set of disjoint paths by only one (see the "avg" columns). If this apparent stability of the error magnitude continues as the graph grows, it is conceivable that we could predict with high probability the error of our algorithms for a given graph size. This would be an interesting contrast to Theorem I proved earlier, stating that no absolute bound on error could be guaranteed. graphs that are characteristic of those we expect to see in practice.

Finding Bounded Connective Paths

Given its close relationship to BDP, one might be inclined to think that analogs of the results and techniques for BDP in the previous section could be developed for BCP. In fact, this is somewhat true.

Let bcp (G, b, s, t) denote the b-connectivity from s to t in G. With regards to complexity, computing whether bcp (G, b, s, t)$\geq$k is coNP-complete, which like NP-completeness, is widely believed to imply that bcp(G, b, s, t) cannot be computed in polynomial time. This complexity has other implications that we care about. Following the widely held belief that NP$\neq$coNP, it implies that there is no polynomial-time (in the case of G) algorithm for verifying that there is a set of k-connective b-bounded paths from s to t, even if k and the set of paths (or any other information) is given. For a service like PathServer, this means that clients that request bounded connective paths will either have to trust PathServer that the returned paths are k-connective (for the value k that it returns) or be prepared to perform a possibly exponential computation to verify this assertion. This is one of the main differentiators between bounded connective paths and bounded disjoint paths, the latter of which can be easily verified by clients.

Below, we describe the algorithm that the inventors presently use to approximate a solution to BCP in Path-Server. To describe it, we first introduce some concepts. For a set of D paths, the subgraph induced by D is the graph whose nodes and edges are those that occur on some path in D. The (s, b, t)-closure of a set of D of paths from s to t (or just the b-closure when s and t are understood) is the set of b-bounded paths from s to t in the subgraph induced by D.

Given G, b, s, and t, our algorithm returns a set D of b-bounded paths from s to t and the value k such that the b-closure of D is k-connective. Note that the subgraph induced by D is identical to that induced by its b-closure, and thus D is indistinguishable from its b-closure when graphically displayed by PathServer. The set D of b-bounded paths is constructed in polynomial time, but finding k still takes time exponential in the size of the graph in the worst case. Fortunately, this exponential computation executes on the typically small subgraph induced by D, and so it almost always completes with brief delay.

The algorithm is outlined in Table 5. It begins by locating a set D of disjoint b-bounded paths from s to t using one of the algorithms described earlier. The algorithm repeatedly augments D with other b-bounded paths from s to t. At each step the augmenting path is chosen to minimize some criterion $\Psi(p, l)$. The criterion that we use is based on the path degree pdeg (c, D) of node c with respect to D, which is the degree of c in the subgraph induced by D. Our criterion is to choose the path that minimizes the sum of the path degrees of its nodes, i.e., $$\Psi(p, D) - \sum_{c \in p} pdeg(c, D)$$

The repeated augmentation of D terminates on some condition T. In our present implementation, this condition is met when |D|=bd/2 where d is the original size of D at the end of step 1 in Table 5. This choice of $\Psi$ is motivated by the fact that the b-connectivity from s to t is at most b/2 times the size of a maximum set of disjoint paths from s to t.

Once the condition T is met, the algorithm determines k such that the (s, t, b)-closure of D is k-connective (ignoring the path s→t if it is present in D). This algorithm is essentially brute force, iterating through sets of nodes and testing if a path in the b-closure of D would continue to exist if those nodes were removed. To optimize this algorithm, any path in D that is disjoint from all other paths in D is removed before the search begins, as each such paths contributes exactly one to the final value of k. In the other paths, only nodes with in-degree or out-degree greater than one in the subgraph induced by D need be included in sets whose removal is tested.

TABLE 5

Approximation Algorithm for BCP on Instance (G=(V,E), b, s, t)

1. Find a set D of disjoint b-bounded paths from s to t using one of the algorithms described earlier. If D = 0, then return <0, D>.
2. Find a path
$$p = s \rightarrow c_1 \rightarrow \ldots \rightarrow c_l \rightarrow t, 1 \leq l \leq b$$
in G such that $\Phi(p, D)$ is the minimum overall such paths.
3. Set D = D ∪ {p}. If termination condition is not met, go to 2; otherwise go to step 4.
4. Compute k such (s, t, b)-closure D\ {s → t} is k-connective, and return <k, D>.

Herein we have introduced bounded disjoint paths as a tool for supporting high-assurance authentication in large distributed systems. We have focused on two flavors of independent paths, namely disjoint and k-connective. For the former we have developed algorithms for approximating the maximum number of bounded disjoint paths from a source to a target and evaluated their accuracy on graphs constructed from a PGP certification graph. We have also developed an approximation algorithm for the latter. We have demonstrated the utility of these notions in a useful application called PathServer. While the above discussion has pertained mainly to PGP applications, the bounded independent paths paradigm of the present invention can improve authentication mechanisms for a wide range of systems, even those based on technologies other than public keys.

What is claimed is:

1. A method for authenticating a channel in a large distributed system, comprising the steps of:
    a) determining a set of independent paths, each of length at most a predetermined value, by which the channel could have been authenticated; and
    b) using the paths in the set to authenticate the channel.

2. The method according to claim 1, wherein the set of independent paths comprises a set of disjoint paths.

3. The method according to claim 1, wherein the set of independent paths comprises a set of connective paths.

4. The method according to claim 1, further comprising the step of requiring a plurality of paths in the set to authenticate the channel.

5. The method according to claim 1, wherein step c) further comprises requiring a supermajority vote before authenticating the channel.

6. The method according to claim 1, wherein step c) further comprises requiring a unanimous vote before authenticating the channel.

7. A method for authenticating a target channel (t) using a source channel (s) in a large distributed system comprising the steps of:
    a) determining a plurality of bounded disjoint paths from the source channel (s) to the target channel (t) by:
        (i) selecting a path from the source (s) channel to the target channel (t) of length at most b that intersects a fewest number of other paths from the source channel (s) to the target channel (t) of at length at most b;
        (ii) adding the selected path to the plurality of bounded disjoint paths being determined;
        (iii) deleting the selected path along with all incident edges from a graph of the large distributed system to obtain a revised version of the graph; and
        (iv) repeating steps (i) through (iii) using a revised version of the graph in each iteration until no more paths can be found in step (i); and
    b) using the plurality of bounded disjoint paths to authenticate the target channel (t).

8. The method according to claim 7, wherein the path determined in step a)(i) is a shortest path from the source channel (s) to the target channel (t) with a length less than b.

9. The method according to claim 7, wherein the path determined in step a)(i) is a path from the source channel (s) to the target channel (t) with a length less than b having a smallest degree, wherein a degree of a path is a sum of a degree of each node in the path, and the degree of a node equals a number of edges incident on the node.

10. The method according to claim 7, wherein step a) further comprises the steps of:
    (v) assigning a random weight to each node in the graph;
    (vi) defining a weight for each path, wherein the weight of each path is the sum of the random weights of the nodes in the path; and
    (vii) determining the path in step (i) by generating a random number and selecting the path whose weight matches the random number.

11. A web server providing a plurality of bounded disjoint paths for use in authenticating a target channel (t) using a source channel (s) in a large distributed system comprising:
    a) means for interfacing with a user to accept a source channel (s) and a target channel (t) specified by the user;
    b) means for determining a plurality of bounded disjoint paths from the source channel (s) to the target channel (t), said means for determining:
        (i) selecting a path from the source (s) channel to the target channel (t) of length at most b that intersects a fewest number of other paths from the source channel (s) to the target channel (t) of at length at most b;
        (ii) adding the selected path to the plurality of bounded disjoint paths being determined by the determining means;
        (iii) deleting the selected path along with all incident edges from a graph of the large distributed system to obtain a revised version of the graph; and
        (iv) repeating (i) through (iii) using a revised version of the graph in each iteration until no more paths can be found in (i); and
    c) means for outputting the plurality of disjoint paths from the source channel (s) to the target channel (t) upon request by a user.

12. The web server according to claim 11, wherein the path determined by the determining means constitutes a shortest path from the source channel (s) to the target channel (t) with a length less than b.

13. The web server according to claim 11, wherein the path determined by the determining means constitutes a path from the source channel (s) to the target channel (t) with a length less than b having a smallest degree, wherein a degree of a path is a sum of a degree of each node in the path, and the degree of a node equals a number of edges incident on the node.

14. The web server according to claim 11, wherein the determining means assigns a random weight to each node in the graph, defines a weight for each path, the weight of each path being a sum of each random weight of the nodes in the path, and determines the path by generating a random number and selecting the path whose weight matches the random number.

15. The web server according to claim 11, wherein the means for interfacing with the user further comprises a World Wide Web interface by which a user can submit a path length bound, a plurality of PGP identifiers for a source key and a target key, and a choice of disjoint or connective paths and receive in real time a display of a plurality of requested paths.

16. An apparatus for determining an owner of a query key using a sequence of certificates from a trusted key to the query key, wherein a key in each certificate in the sequence verifies a signature on a next certificate in the sequence, and a certificate binds a key to a name and email address using a digital signature, said apparatus comprising:
   a) a processor determining a plurality of bounded independent paths from the trusted key to the query key;
   b) a database being coupled to the processor and storing a plurality of PGP certificates, wherein said database includes an interface for receiving periodic updates from a plurality of PGP key servers; and
   c) a graphical user interface accepting input from the user regarding a path length bound, the trusted key, and the query key.

17. The apparatus according to claim 16, wherein the certificates include IETFX.509 certificates.

18. The apparatus according to claim 16, wherein the graphical user interface includes means for designating an output format, wherein the output format includes graphical, text or ASCII-armored blocks.

19. A method for authenticating a target channel comprising the steps of:
   a) determining a set of disjoint b-bounded paths from a source channel to a target channel;
   b) augmenting the set of disjoint b-bounded paths from the source channel to the target channel with other b-bounded paths from the source channel to the target channel;
   c) choosing a path to augment the set of disjoint b-bounded paths in step b) by minimizing a predetermined criteria; and
   d) terminating the step of augmenting upon a predetermined condition.

20. The method according to claim 19, wherein the predetermined criteria comprises choosing a particular path that minimizes a sum of path degrees of nodes within the particular path, wherein the path degree is a degree of c in a subgraph induced by the set of disjoint paths.

21. The method according to claim 19, wherein the predetermined condition includes when the size of the set of disjoint paths equals one half the path bound times an original size of the set of disjoint paths prior to any augmentation.

22. The method according to claim 19, further comprising the step of determining the size of the connectivity by iterating through sets of nodes and testing to determine if a path in the b-closure of the set would continue to exist if those nodes were removed from all other paths in the set.

23. The method according to claim 22, further comprising the step of removing any disjoint path from the set prior to performing the step of determining the size of the connectivity.

24. The method according to claim 19, wherein the step a) of determining further comprises the substeps of:
   (i) finding a path from the source channel to the target channel of length at most b that intersects a fewest number of other paths from the source channel to the target channel of at length at most b;
   (ii) adding the path found in step (i) to the plurality of bounded disjoint paths being determined;
   (iii) deleting the path added in step (ii) along with all incident edges from a graph of the large distributed system; and
   (iv) repeating steps (i) through (iii) until no more paths can be found in step (i).

25. The method according to claim 24, wherein the path being found in step (i) is the shortest path from the source channel to the target channel with a length less than b.

26. The method according to claim 24, wherein the path being found in step (i) is a path from the source channel to the target channel with a length less than b having a smallest degree, wherein the degree of the path is a sum of a degree of each node in the path, and the degree of a node equals a number of edges incident on the node.

27. The method according to claim 24, wherein step a) further comprises the substeps of:
   (v) assigning a random weight to each node in the graph;
   (vi) defining a weight for each path, wherein the weight of each path is the sum of the random weights of the nodes in the path; and
   (vii) determining the path in step (i) by generating a random number and selecting the path whose weight matches the random number.

28. A method for assuring authentication for data received comprising the steps of:
   a) receiving the data;
   b) requesting assurance over a trusted channel to an authentication authority;
   c) learning a graph of the received data;
   d) determining a set of independent paths by which the channel could have been authenticated;
   e) deleting paths from the set determined in step d) whose length exceeds a predetermined value; and
   f) using any paths remaining in the set determined in step e) to authenticate the channel.

29. The method according to claim 28, wherein the set of independent paths comprises a set of disjoint paths.

30. The method according to claim 28, wherein the set of independent paths comprises a set of connective paths.

31. The method according to claim 28, further comprising the step of requiring a plurality of paths in the set to authenticate the channel.

32. The method according to claim 28, wherein step f) further comprises requiring a supermajority vote before authenticating the channel.

33. The method according to claim 28, wherein step f) further comprises requiring a unanimous vote before authenticating the channel.

* * * * *